(12) United States Patent
Kamhi et al.

(10) Patent No.: US 9,213,412 B2
(45) Date of Patent: Dec. 15, 2015

(54) MULTI-DISTANCE, MULTI-MODAL NATURAL USER INTERACTION WITH COMPUTING DEVICES

(71) Applicant: Intel Corporation, Santa Clara, CA (US)

(72) Inventors: Gila Kamhi, Zichron Yaakov (IL); Barak Hurwitz, Kibbutz Alonim (IL); Amit Moran, Tel Aviv (IL); Dror Reif, Be'er-Yacoov (IL); Ron Ferens, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,493

(22) PCT Filed: Mar. 15, 2013

(86) PCT No.: PCT/US2013/032469
§ 371 (c)(1),
(2) Date: Jun. 27, 2013

(87) PCT Pub. No.: WO2014/107182
PCT Pub. Date: Jul. 10, 2014

(65) Prior Publication Data
US 2014/0292639 A1   Oct. 2, 2014

Related U.S. Application Data

(60) Provisional application No. 61/748,936, filed on Jan. 4, 2013.

(51) Int. Cl.
*G06F 3/01*   (2006.01)
*G06F 3/038*  (2013.01)
*G06F 3/14*   (2006.01)

(52) U.S. Cl.
CPC .............. *G06F 3/017* (2013.01); *G06F 3/012* (2013.01); *G06F 3/013* (2013.01); *G06F 3/038* (2013.01); *G06F 3/1423* (2013.01); *G06F 2203/0381* (2013.01)

(58) Field of Classification Search
CPC ...................................................... G06F 3/013
USPC .................. 345/1.1–3.4, 55–111; 361/679.41
See application file for complete search history.

(56) References Cited

U.S. PATENT DOCUMENTS 8,339,364 B2   12/2012  Takeda et al.
2004/0141162 A1  7/2004  Olbrich
(Continued)

OTHER PUBLICATIONS

International Search Report and Written Opinion received for PCT Patent Application No. PCT/US2013/032469, mailed on Oct. 16, 2013, 14 pages.

*Primary Examiner* — Michael Pervan
(74) *Attorney, Agent, or Firm* — Jordan IP Law, LLC

(57) ABSTRACT

Systems and methods may provide for receiving a short range signal from a sensor that is collocated with a short range display and using the short range signal to detect a user interaction. Additionally, a display response may be controlled with respect to a long range display based on the user interaction. In one example, the user interaction includes one or more of an eye gaze, a hand gesture, a face gesture, a head position or a voice command, that indicates one or more of a switch between the short range display and the long range display, a drag and drop operation, a highlight operation, a click operation or a typing operation.

25 Claims, 4 Drawing Sheets

(56) References Cited

U.S. PATENT DOCUMENTS

| | | |
|---|---|---|
| 2009/0141895 A1 | 6/2009 | Anderson et al. |
| 2010/0315327 A1* | 12/2010 | Virolainen .................... 345/156 |
| 2011/0141063 A1 | 6/2011 | Grundmann et al. |
| 2012/0017147 A1 | 1/2012 | Mark |

* cited by examiner

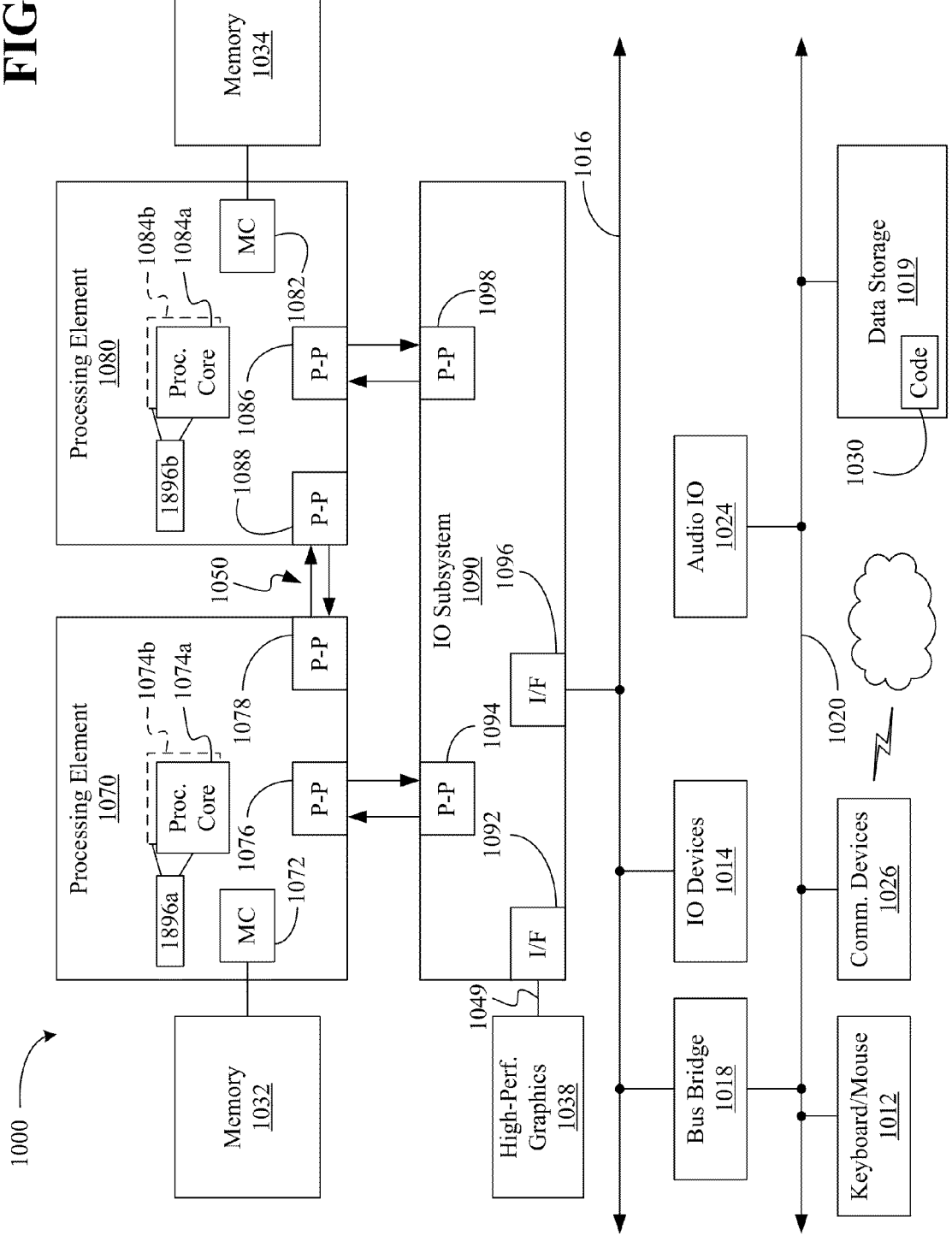

MULTI-DISTANCE, MULTI-MODAL NATURAL USER INTERACTION WITH COMPUTING DEVICES

TECHNICAL FIELD

Embodiments generally relate to user-based interactions with computing devices. More particularly, embodiments relate to multi-distance, multi-modal natural user interaction (MiI) with computing devices.

BACKGROUND

Eye tracking may be used to enhance user-based interactions with computing devices and displays. Conventional eye tracking solutions, however, may be limited to relatively short interaction distances (e.g., 30 cm to 90 cm distance between tracking sensor/display and subject). Moreover, biological considerations such as eyelid and/or eyelash obstruction may dictate that the tracking sensor be positioned near the bottom of the display with which the subject is interacting. Such a positioning may ultimately add to the overall cost of the computing device.

BRIEF DESCRIPTION OF THE DRAWINGS

The various advantages of the embodiments will become apparent to one skilled in the art by reading the following specification and appended claims, and by referencing the following drawings, in which:

FIG. 7 is a block diagram of an example of a system according to an embodiment.

DESCRIPTION OF EMBODIMENTS

Figure 1:
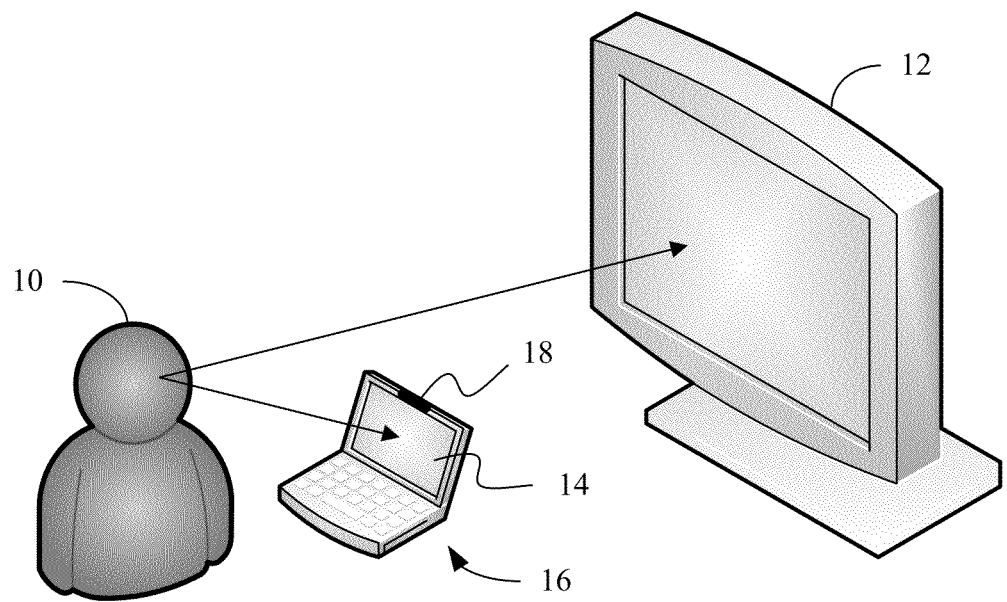
FIG. 1 is an illustration of an example of a multi-distance display arrangement according to an embodiment.
Figure 2:
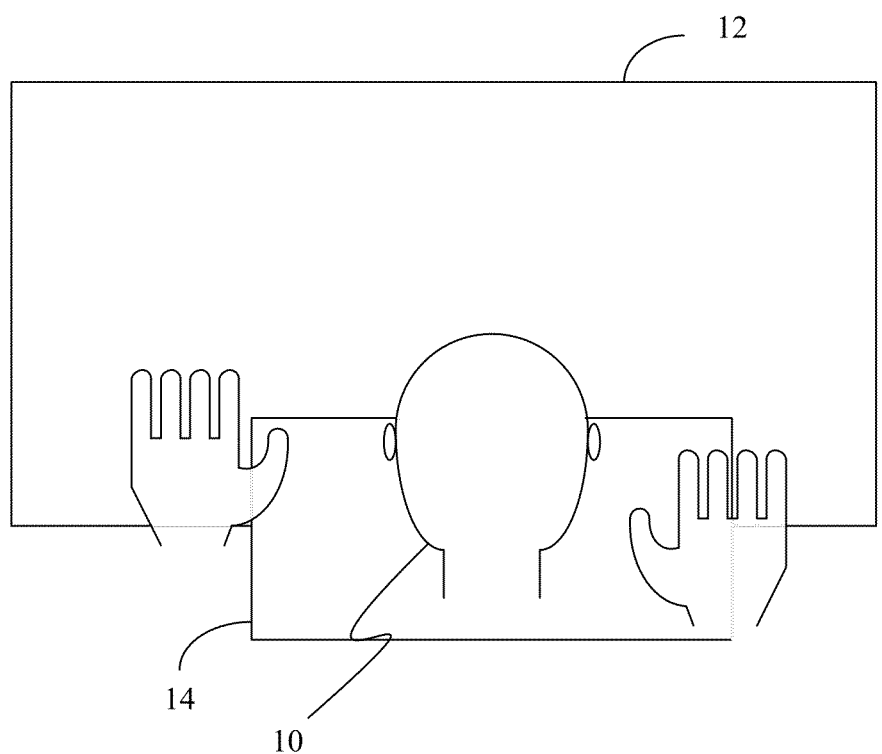
FIG. 2 is an illustration of an example of a user interacting with a multi-distance display arrangement according to an embodiment.

Turning now to FIGS. 1 and 2, a multi-display arrangement is shown in which a user 10 interacts with a long range display 12 (e.g., physical monitor, television/TV, projected display) as well as a short range display 14 (e.g., touch screen/panel) of a computing device 16 (e.g., desktop computer, notebook computer, smart tablet, convertible tablet, mobile Internet device/MID, smartphone or any other mobile device). Thus, the long range display 12 might be mounted, for example, on a wall across the room from the user 10 (e.g., outside the user's physical reach), whereas the short range display 14 may be on a table within reach of the user 10 or held by the user 10. In the illustrated example, a sensor 18 is collocated with (e.g., coupled to, mounted on, integrated with, etc.) the short range display 14, wherein the sensor 18 is configured to generate short range signals based on interactions between the user 10 and the multi-display arrangement. The signals generated by the sensor 18 may be considered "short range" to the extent that the sensor 18 generating the signals is within relatively close proximity to the user 10.

For example, the user interactions may include eye gazes, hand gestures, face gestures, head positions, voice commands, etc., or any combination thereof. Accordingly, the sensor 18 may include an optical sensor such as a camera (e.g., three-dimensional/3D, two-dimensional/2D), a microphone, biometric sensor (e.g., heart rate, fingerprint), etc., or any combination thereof. As will be discussed in greater detail, the user interactions detected via the sensor 18 may be used control the display response of the long range display 12 as well as the display response of the short range display 14. The response of the long range display 12 may be controlled via, for example, an internal connection (e.g., for projected display) within the computing device 16, a wired connection (e.g., Universal Serial Bus/USB, High-Definition Multimedia Interface/HDMI) between the long range display 12 and the computing device 16, a wireless connection (e.g., Wireless Fidelity/Wi-Fi) between the long range display 12 and the computing device 16, and so forth.

Thus, if the sensor 18 tracks the gaze of the user's eyes, the illustrated approach may enable the user 10 to switch between interacting with the short range display 14 and the long range display 12 by merely looking at either of those displays 12, 14. Moreover, the user 10 may perform other more complex operations such as drag and drop operations, highlight operations, click operations, typing operations, and so forth, using gaze-based interactions as well as other interactions such as hand gestures, face gestures, head movements, voice commands, and so forth. Interactions such as hand gestures, face gestures and head movements may be detected by applying object recognition processes to the short range signals obtained from the sensor 18. Similarly, interactions such as voice commands may be detected by applying speech recognition processes to the short range signals obtained from the sensor 18 (e.g., if the sensor includes a microphone).

The user 10 may therefore use, for example, eye gazes, hand/face gestures and speech commands to interact with the long range display 12. Additionally, the user 10 may use, for example, hand touches, keyboard entries, mouse movements/clicks, hand/face gestures and eye gazes to interact with the short range display 14. Accordingly, the illustrated solution may enable more natural user interactions in a multi-display, multi-modal environment.

In one embodiment, the illustrated sensor 18 is positioned at the top of the short range display 14. Accordingly, the sensor 18 may be effective for eye tracking purposes with respect to the long range display 12 without concern over eyelid and/or eyelash obstruction. Additionally, the illustrated placement of the sensor 18 may reduce the cost of the computing system 16 by enabling the sensor 18 to also be used for purposes other than user interaction detection (e.g., standard camera operation, etc.). Simply put, the illustrated approach may obviate the need for separate camera and eye tracking hardware, while facilitating natural user interactions.

Figure 3:
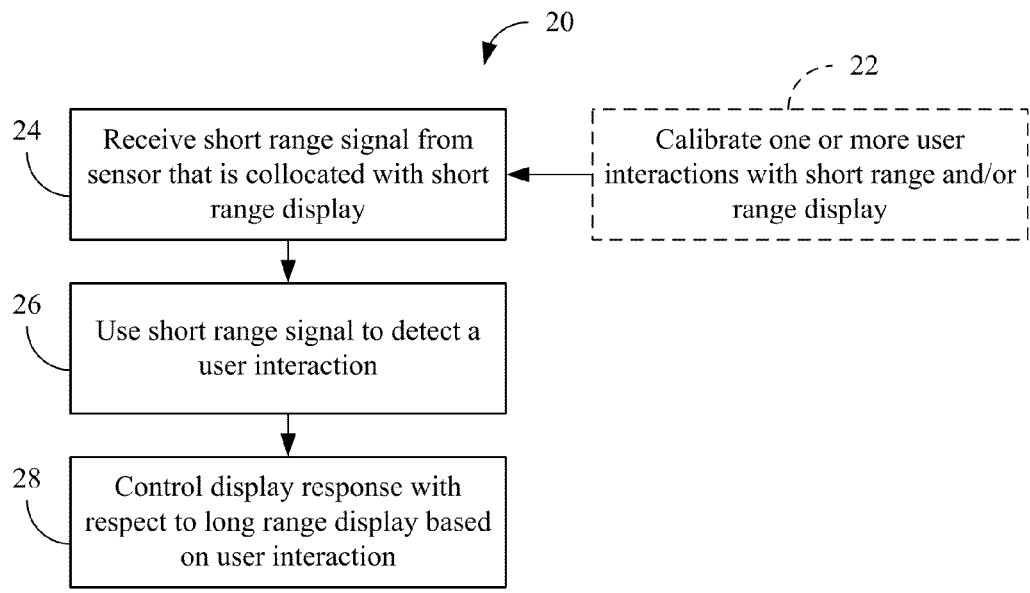
FIG. 3 is a flowchart of an example of a method of facilitating user-based interactions with a multi-distance display arrangement according to an embodiment.

FIG. 3 shows a method 20 of facilitating user-based interactions. The method 20 may be implemented in a computing device as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 20 may be written in any combination of one or more programming languages, including an object oriented programming language such as C++ or the like and conventional procedural programming languages, such as the "C" programming language or similar programming languages. Moreover, the method 20 may be implemented using any of the aforementioned circuit technologies.

Illustrated processing block 22 provides for optionally calibrating one or more user interactions with a short range and/or long range display. As already noted, the user interactions might include eye gazes, hand gestures, face gestures, head positions, voice commands, etc., or any combination thereof. Additionally, the user interactions may indicate that the user is switching from interacting with the short range display to interacting with the long range display (and vice versa), drag and drop operations, highlight operations, click operations, typing operations, and so forth. The calibration process may therefore involve prompting a user to conduct known user interactions and determining one or more parameters to facilitate subsequent recognition of those user interactions. The parameters may be specific to a sensor that is collocated with the short range display. Block 24 may receive a real-time short range signal from the sensor that is collocated with the short range display. The short range signal may be received from, for example, a camera positioned adjacent to (e.g., at a top or bottom) of the short range display, a microphone positioned adjacent to the short range display, and so forth.

Illustrated block 26 uses the short range signal to detect a user interaction, wherein block 28 may control a display response with respect to the long range display based on the user interaction. Block 28 may therefore involve conducting a switch between the short range display and the long range display, a drag and drop operation, a highlight operation, a click operation, a typing operation, and so forth, relative to the long range display. The method 20 may also provide for conducting similar operations with respect to the short range display.

Figure 4:
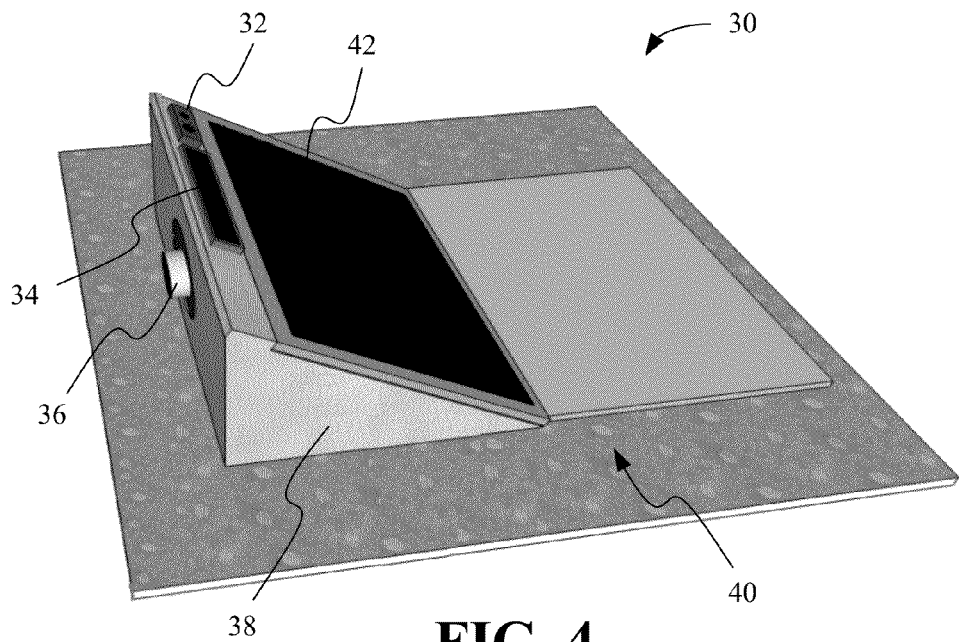
FIG. 4 is a perspective view of an example of a docking station according to an embodiment.

FIG. 4 shows a docking station 30 that may be used in conjunction with the multi-display, multi-modal arrangements described herein. The illustrated docking station 30 has a depth (e.g., 3D) camera 32, an eye tracking sensor 34, a projector 36, and a stand 38 configured to support a display 42 (e.g., short range display) of a computing device 40 at a comfortable viewing angle for a user. The projector 36 may therefore generate a long range display to complement (e.g., in extended mode, duplicate mode, etc.) the short range display 42 of the computing device 40, wherein the camera 32 and the eye tracking sensor 34 may generate short range signals. As already noted, the short range signals may be used to detect user interactions, which may in turn be used to control the display response of the long range display provided by the projector 36 and/or the short range display 42 of the computing device 40.

The illustrated configuration may be particularly useful if the computing device 40 lacks eye tracking, depth imaging and/or projection technology. Other station sensor configurations may also be used. For example, the depth camera 32 and eye tracking sensor 34 may be implemented via the same hardware to reduce costs. Moreover, other sensors such as microphones, biometric sensors, etc., may be used to detect user interactions.

Figure 5:
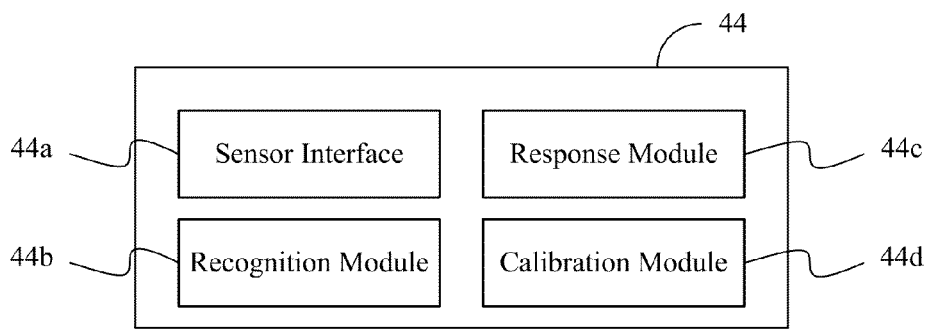
FIG. 5 is a block diagram of an example of a computing device according to an embodiment.

Turning now to FIG. 5, a computing device 44 (44a-d) is shown. The illustrated computing device 44 includes a sensor interface 44a to receive short range signals from one or more sensors that are collocated with a short range display, and a recognition module 44b to use the short range signals to detect user interactions. The computing device 44 may also include a response module 44c to control display responses with respect to a long range display based on the user interactions. The response module 44c may also control display responses with respect to the short range display based on the user interactions. The illustrated computing device 44 also includes a calibration module 44d to calibrate the user interactions for the long range display and/or the short range display.

Figure 6:
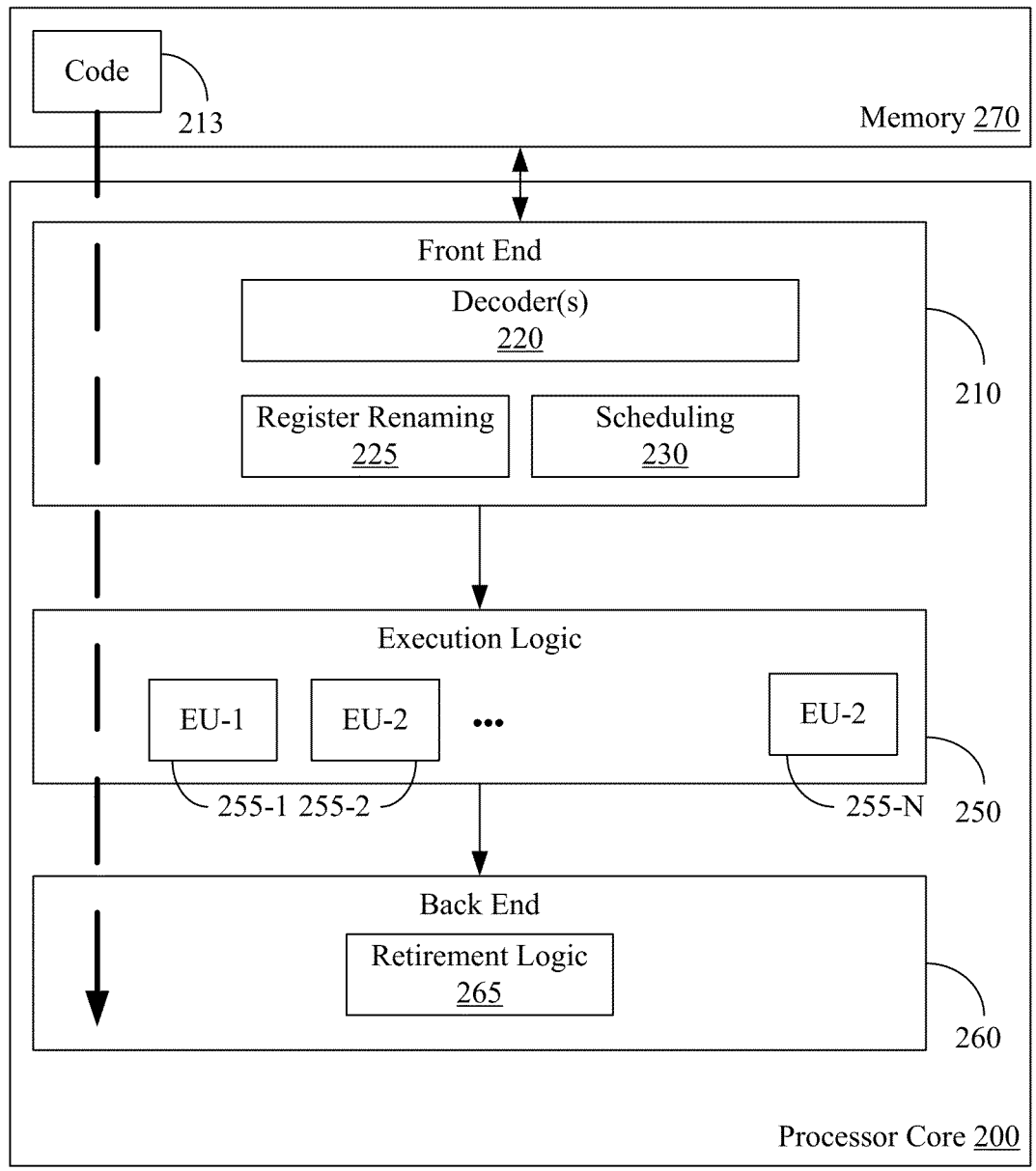
FIG. 6 is a block diagram of an example of a processor core according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the method 20 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include, only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200 in a system on chip (SoC) implementation. For example, a processing element may include memory control logic along with the processor core 200. The processing element may include I/O control logic and/or may include I/O control logic integrated with memory control logic. The processing element may also include one or more caches.

Referring now to FIG. 7, shown is a block diagram of a system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component interconnect (PCI) bus, or a bus such as a PCI Express bus or another third generation I/O interconnect bus, although the scope of the embodiments are not so limited.

As shown in FIG. 7, various I/O devices 1014 (e.g., cameras, sensors, displays, projectors) may be coupled to the first bus 1016, along with a bus bridge 1018 which may couple the first bus 1016 to a second bus 1020, in one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 20 (FIG. 3), already discussed. Further, an audio I/O 1024 may be coupled to second bus 1020.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Additional Notes and Examples

Example 1 may include a system to facilitate user-based interactions. The system may include a short range display, a sensor collocated with the short range display and a sensor interface to receive a short range signal from the sensor. The system may also include a recognition module to use the short range signal to detect a user interaction, wherein the user interaction is to include one or more of an eye gaze, a hand gesture, a face gesture, a head position or a voice command, and a response module to control a display response with respect to a long range display based on the user interaction.

Example 2 may include the system of example 1, wherein the user interaction indicates a switch between the short range display and the long range display Example 3 may include the system of example 1, wherein the user interaction is to indicate one or more of a drag and drop operation, a highlight operation, a click operation or a typing operation.

Example 4 may include the system of example 1, wherein the response module is to further control a display response with respect to the short range display based on the user interaction.

Example 5 may include the system of example 1, further including a calibration module to calibrate the user interaction for one or more of the long range display or the short range display.

Example 6 may include the system of example 1, wherein the sensor is one or more of a camera positioned at a top of the short range display or a microphone positioned adjacent to the short range display.

Example 7 may include the system of claim 6, wherein the camera positioned at the top of the short range display includes eye tracking functionality.

Example 8 may include the system of example 1, wherein the display response is to be controlled with respect to one of a projected display or a physical display.

Example 9 may include the system of any one of examples 1 to 8, further including a docking station having a projector to generate the long range display.

Example 10 may include a method of facilitating user-based interactions. The method may provide for receiving a short range signal from a sensor that is collocated with a short range display and using the short range signal to detect a user interaction, wherein the user interaction includes one or more of an eye gaze, a hand gesture, a face gesture, a head position or a voice command. Additionally, the method may involve controlling a display response with respect to a long range display based on the user interaction.

Example 11 may include the method of example 10, wherein the user interaction includes one or more of a switch between the short range display and the long range display Example 12 may include the method of example 10, wherein the user interaction indicates one or more of a drag and drop operation, a highlight operation, a click operation or a typing operation.

Example 13 may include the method of example 10, further including controlling a display response with respect to the short range display based on the user interaction.

Example 14 may include the method of example 10, further including calibrating the user interaction for one or more of the long range display or the short range display.

Example 15 may include the method of example 10, wherein the short range signal is received from one or more of a camera positioned at a top of the short range display or a microphone positioned adjacent to the short range display.

Example 16 may include the method of claim 15, wherein the short range signal is an eye tracking signal received from the camera positioned at the top of the short range display.

Example 17 may include the method of any one of examples 10 to 17, wherein the display response is controlled with respect to one of a projected display or a physical display.

Example 18 may include at least one computer readable storage medium having a set of instructions which, if executed by a computing device, cause the computing device to receive a short range signal from a sensor that is collocated with a short range display. The instructions, if executed, may also cause a computing device to use the short range signal to detect a user interaction and control a display response with respect to a long range display based on the user interaction.

Example 19 may include the at least one computer readable storage medium of example 18, wherein the user interaction is to include one or more of an eye gaze, a hand gesture, a face gesture, a head position or a voice command, that indicates one or more of a switch between the short range display and the long range display, a drag and drop operation, a highlight operation, a click operation or a typing operation.

Example 20 may include the at least one computer readable storage medium of example 18, wherein the instructions, if executed, cause a computing device to control a display response with respect to the short range display based on the user interaction.

Example 21 may include the at least one computer readable storage medium of example 18, wherein the instructions, if executed, cause a computing device to calibrate the user interaction for one or more of the long range display or the short range display.

Example 22 may include the at least one computer readable storage medium of example 18, wherein the short range signal is to be received from one or more of a camera positioned at a top of the short range display or a microphone positioned adjacent to the short range display.

Example 23 may include the at least one computer readable storage medium of any one of examples 18 to 22, wherein the display response is to be controlled with respect to one of a projected display or a physical display.

Example 24 may include an apparatus to facilitate user-based interactions. The apparatus may include a sensor interface to receive a short range signal from a sensor that is collocated with a short range display and a recognition module to use the short range signal to detect a user interaction, wherein the user interaction is to include one or more of an eye gaze, a hand gesture, a face gesture, a head position or a voice command. The apparatus may also include a response module to control a display response with respect to a long range display based on the user interaction.

Example 25 may include the apparatus of example 24, wherein the user interaction is to indicate one or more of a switch between the short range display and the long range display, a drag and drop operation, a highlight operation, a click operation or a typing operation.

Example 26 may include the apparatus of example 24, wherein the response module is to control a display response with respect to the short range display based on the user interaction.

Example 27 may include the apparatus of example 24, further including a calibration module to calibrate the user interaction for one or more of the long range display or the short range display.

Example 28 may include the apparatus of example 24, wherein the short range signal is to be received from one or more of a camera positioned at a top of the short range display or a microphone positioned adjacent to the short range display.

Example 29 may include the apparatus of any one of examples 24 to 28, wherein the display response is to be controlled with respect to one of a projected display or a physical display.

Example 30 may include an apparatus to facilitate user-based interactions, including means for performing the method of any one of examples 8 to 17.

Techniques described herein may therefore facilitate cost-efficient long-distance eye tracking and gesture interaction in computing devices having mobile form factors. For example, the ability to simultaneously interact naturally with long range displays and short range displays may enable new usage models and applications that extend beyond what may be envisioned under conventional solutions.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system to facilitate user-based interactions, comprising:
    a short range display;
    an optical sensor at least effective to conduct eye-tracking with respect to a long range display and is collocated with the short range display;
    a sensor interface to receive a short range signal from the sensor;
    a recognition module to use the short range signal to detect a user interaction; and
    a response module to control a display response with respect to the long range display based on the user interaction.

2. The system of claim 1, wherein the user interaction is to include one or more of an eye gaze, a hand gesture, a face gesture, a head position and a voice command, that indicates one or more of a switch between the short range display and the long range display, a drag and drop operation, a highlight operation, a click operation and a typing operation.

3. The system of claim 1, wherein the response module is to further control a display response with respect to the short range display based on the user interaction.

4. The system of claim 1, further including a calibration module to calibrate the user interaction for one or more of the long range display and the short range display.

5. The system of claim 1, wherein the sensor is one or more of a camera positioned at a top of the short range display and a microphone positioned adjacent to the short range display.

6. The system of claim 1, wherein the display response is to be controlled with respect to one of a projected display and a physical display.

7. The system of claim 1, further including a docking station having a station sensor to generate the short range signal and a projector to generate the long range display.

8. A method of facilitating user-based interactions, comprising:
   receiving a short range signal from an optical sensor that is at least effective to conduct eye-tracking with respect to a long range display and is collocated with a short range display;
   using the short range signal to detect a user interaction; and
   controlling a display response with respect to the long range display based on the user interaction.

9. The method of claim 8, wherein the user interaction includes one or more of an eye gaze, a hand gesture, a face gesture, a head position and a voice command, that indicates one or more of a switch between the short range display and the long range display, a drag and drop operation, a highlight operation, a click operation and a typing operation.

10. The method of claim 8, further including controlling a display response with respect to the short range display based on the user interaction.

11. The method of claim 8, further including calibrating the user interaction for one or more of the long range display and the short range display.

12. The method of claim 8, wherein the short range signal is received from one or more of a camera positioned at a top of the short range display and a microphone positioned adjacent to the short range display.

13. The method of claim 8, wherein the display response is controlled with respect to one of a projected display and a physical display.

14. At least one computer readable non-transitory storage medium comprising a set of instructions which, if executed by a computing device, cause the computing device to:
   receive a short range signal from an optical sensor that is at least effective to conduct eye-tracking with respect to a long range display and is collocated with a short range display;
   use the short range signal to detect a user interaction; and
   control a display response with respect to a long range display based on the user interaction.

15. The at least one computer readable non-transitory storage medium of claim 14, wherein the user interaction is to include one or more of an eye gaze, a hand gesture, a face gesture, a head position and a voice command, that indicates one or more of a switch between the short range display and the long range display, a drag and drop operation, a highlight operation, a click operation and a typing operation.

16. The at least one computer readable non-transitory storage medium of claim 14, wherein the instructions, if executed, cause a computing device to control a display response with respect to the short range display based on the user interaction.

17. The at least one computer readable non-transitory storage medium of claim 14, wherein the instructions, if executed, cause a computing device to calibrate the user interaction for one or more of the long range display and the short range display.

18. The at least one computer readable non-transitory storage medium of claim 14, wherein the short range signal is to be received from one or more of a camera positioned at a top of the short range display and a microphone positioned adjacent to the short range display.

19. The at least one computer readable non-transitory storage medium of claim 14, wherein the display response is to be controlled with respect to one of a projected display and a physical display.

20. An apparatus to facilitate user-based interactions, comprising:
   a sensor interface to receive a short range signal from an optical sensor that is at least effective to conduct eye-tracking with respect to a long range display and is collocated with a short range display;
   a recognition module to use the short range signal to detect a user interaction; and
   a response module to control a display response with respect to the long range display based on the user interaction.

21. The apparatus of claim 20, wherein the user interaction is to include one or more of an eye gaze, a hand gesture, a face gesture, a head position and a voice command, that indicates one or more of a switch between the short range display and the long range display, a drag and drop operation, a highlight operation, a click operation and a typing operation.

22. The apparatus of claim 20, wherein the response module is to control a display response with respect to the short range display based on the user interaction.

23. The apparatus of claim 20, further including a calibration module to calibrate the user interaction for one or more of the long range display and the short range display.

24. The apparatus of claim 20, wherein the short range signal is to be received from one or more of a camera positioned at a top of the short range display and a microphone positioned adjacent to the short range display.

25. The apparatus of claim 20, wherein the display response is to be controlled with respect to one of a projected display and a physical display.

* * * * *